(12) United States Patent
Wilson (10) Patent No.: US 11,025,350 B2
(45) Date of Patent: Jun. 1, 2021

(54) DETECTION AND CHARACTERISATION OF PASSIVE INTERMODULATION AT A MIMO ANTENNA ARRAY

(71) Applicant: AceAxis Limited, Harlow (GB)

(72) Inventor: Fiona Wilson, Harlow (GB)

(73) Assignee: AceAxis Limited, Harlow (GB)

( * ) Notice: Subject to any disclaimer, the term of this patent is extended or adjusted under 35 U.S.C. 154(b) by 0 days.

(21) Appl. No.: 16/796,673

(22) Filed: Feb. 20, 2020

(65) Prior Publication Data

US 2020/0274629 A1 Aug. 27, 2020

(30) Foreign Application Priority Data

Feb. 25, 2019 (GB) ..................................... 1902504

(51) Int. Cl.
*H04B 17/345* (2015.01)
*H04B 1/709* (2011.01)
(Continued)

(52) U.S. Cl.
CPC ........... *H04B 17/345* (2015.01); *H04B 1/709* (2013.01); *H04B 7/0413* (2013.01); *H04L 25/03006* (2013.01); *H04L 2025/03426* (2013.01)

(58) Field of Classification Search
CPC .... H04B 1/525; H04B 17/336; H04B 1/1027; H04B 1/109; H04B 1/123; H04B 17/345;
(Continued)

(56) References Cited

U.S. PATENT DOCUMENTS 9,548,775 B2 * 1/2017 Smith ..................... H04B 1/109
9,768,812 B1 * 9/2017 Tsui ..................... H04B 17/0085
(Continued)

FOREIGN PATENT DOCUMENTS

GB 2502281 A 11/2013
WO 2017130301 A1 10/2018

OTHER PUBLICATIONS

United Kingdom Combined Search and Examination Report dated Aug. 22, 2019 for GB Application No. 1902504.8.

*Primary Examiner* — Lana N Le
(74) *Attorney, Agent, or Firm* — EIP US LLP (57) ABSTRACT

A method of detecting and characterising passive intermodulation interference comprises receiving first digital signals representing respective first MIMO signal components transmitted at a first carrier frequency from each antenna of a first group of antennas, receiving second digital signals representing respective second MIMO signal components transmitted at a second carrier frequency from each antenna of a second group of antennas, and receiving third digital signals representing signals received at an antenna under analysis. The first and second digital signals are processed to determine a plurality of partial simulated PIM signals, each being generated from samples of a respective one of the MIMO signal components transmitted from one group of the first and second groups of antennas and from samples of all of the MIMO signal components transmitted from the other group of the first and second groups of antennas. A magnitude is determined of a cross-correlation between the third digital signals and each of the plurality of partial simulated PIM signals.

15 Claims, 7 Drawing Sheets

(51) Int. Cl.
*H04B 7/0413* (2017.01)
*H04L 25/03* (2006.01)

(58) Field of Classification Search
CPC .... H04B 17/0085; H04B 1/0475; H04B 1/10; H04B 10/07953; H04B 1/1036; H04B 2001/1045; H04B 17/318; H04B 1/1018; H04B 17/18; H04B 1/7087; H04B 1/71; H04B 1/711; H04B 1/715; H04B 2001/1072; H04B 10/25; H04B 17/23; H04B 17/309; H04B 17/382; H04B 1/7097; H04B 2001/0425; H04B 2001/1054; H04B 2201/70728; H04B 15/00; H04B 1/04; H04B 1/126; H04B 1/709; H04B 7/0413; H04B 7/373; H04L 27/0008; H04L 25/03821; H04L 25/08; H04L 27/2647; H04L 27/2691; H04L 25/03006; H04L 1/0026; H04L 5/001; H04L 5/006; H04L 1/0003; H04L 2025/03426; H04L 27/122; H04J 11/0023; H04J 11/0026; H04J 11/005; H04Q 2011/0083; H04W 72/082; H04W 36/20; H04W 28/0236; H04W 40/12; H04W 52/241; H04W 72/0433; H04W 72/085; H04W 24/08; H04W 72/123; H04W 52/223; H04W 52/52
See application file for complete search history.

(56) References Cited

U.S. PATENT DOCUMENTS

| | | | |
|---|---|---|---|
| 10,009,784 B1 * | 6/2018 | Evircan | H04L 41/5009 |
| 10,141,961 B1 * | 11/2018 | Huang | H04B 1/12 |
| 2002/0094785 A1 * | 7/2002 | Deats | H04B 1/1027 |
| | | | 455/67.13 |
| 2004/0048576 A1 | 3/2004 | Hildebrand et al. | |
| 2013/0071112 A1 * | 3/2013 | Melester | H04B 17/12 |
| | | | 398/38 |
| 2014/0378067 A1 * | 12/2014 | Au | H04B 17/0085 |
| | | | 455/67.11 |
| 2015/0171902 A1 * | 6/2015 | Fleischer | H04B 17/19 |
| | | | 375/285 |
| 2016/0261297 A1 * | 9/2016 | Heinikoski | H04L 5/1461 |
| 2016/0301436 A1 * | 10/2016 | Zou | H04B 1/525 |
| 2017/0201277 A1 * | 7/2017 | Wang | H04B 1/10 |
| 2017/0237484 A1 * | 8/2017 | Heath | H04B 10/07953 |
| | | | 398/26 |
| 2017/0250765 A1 * | 8/2017 | Hasarchi | H04B 17/23 |
| 2017/0279196 A1 * | 9/2017 | Black | H01Q 3/36 |
| 2018/0219636 A1 * | 8/2018 | Gale | H04B 17/26 |
| 2018/0294903 A1 * | 10/2018 | Goodman | H04B 17/336 |
| 2018/0295617 A1 * | 10/2018 | Abdelmonem | H04W 72/0433 |
| 2018/0323815 A1 * | 11/2018 | Beadles | H04B 1/123 |
| 2019/0007078 A1 * | 1/2019 | Tsui | H04B 17/11 |
| 2019/0052381 A1 * | 2/2019 | Abdelmonem | H04L 27/2647 |
| 2019/0058534 A1 * | 2/2019 | Anderson | H04W 24/08 |
| 2019/0319653 A1 * | 10/2019 | Wyville | H04B 1/525 |
| 2019/0363750 A1 * | 11/2019 | Lai | H04B 1/109 |
| 2020/0252094 A1 * | 8/2020 | Wang | H04B 1/10 |

* cited by examiner

| Tx antenna included in calculation ||||||||
|---|---|---|---|---|---|---|---|
| Tx Antenna under test | | B17#1 | B17#2 | B14#1 | B14#2 | B14#3 | B14#4 |
| | B17#1 | ✓ | | ✓ | ✓ | ✓ | ✓ |
| | B17#2 | | ✓ | ✓ | ✓ | ✓ | ✓ |
| | B14#1 | ✓ | ✓ | ✓ | | | |
| | B14#2 | ✓ | ✓ | | ✓ | | |
| | B14#3 | ✓ | ✓ | | | ✓ | |
| | B14#4 | ✓ | ✓ | | | | ✓ |

Figure 3

| | BETA | Rx Antenna Port | | | |
|---|---|---|---|---|---|
| | | B14#1 | B14#2 | B14#3 | B14#4 |
| | | PASS | FAIL | PASS | PASS |
| Primary Sector BETA Tx Antenna Port | B17#1 | -4.5 | -7.8 | -6.8 | -2.0 |
| | B17#2 | -2.8 | -0.3 | -1.3 | -5.0 |
| | | | | | |
| | B14#1 | -12.3 | -18.6 | -18.4 | -15.2 |
| | B14#2 | -5.5 | -10.2 | -3.2 | -7.4 |
| | B14#3 | -16.8 | -8.0 | -10.7 | -14.4 |
| | B14#4 | -13.4 | -20.8 | -16.6 | -16.6 |
| Adjacent Sector GAMMA Tx Antenna Port | B17#1 | - | - | - | - |
| | B17#2 | - | - | - | - |
| | | | | | |
| | B14#1 | - | - | - | - |
| | B14#2 | - | - | - | - |
| | B14#3 | - | - | - | - |
| | B14#4 | - | - | - | - |
| Adjacent Sector ALPHA Tx Antenna Port | B17#1 | - | - | - | - |
| | B17#2 | - | - | - | - |
| | | | | | |
| | B14#1 | - | - | - | - |
| | B14#2 | - | - | - | - |
| | B14#3 | - | - | - | - |
| | B14#4 | - | - | - | - |

Figure 4

|  | GAMMA | Rx Antenna Port | | | |
|---|---|---|---|---|---|
|  |  | B14#1 | B14#2 | B14#3 | B14#4 |
|  |  | FAIL | PASS | PASS | FAIL |
| Adjacent Sector GAMMA Tx Antenna Port | B17#1 | -0.2 | -3.3 | -1.1 | -0.2 |
| | B17#2 | -11.4 | -2.4 | -5.1 | -7.6 |
| | | | | | |
| | B14#1 | -0.5 | -8.2 | -3.1 | -0.9 |
| | B14#2 | -26.4 | -6.1 | -13.3 | -20.5 |
| | B14#3 | -28.8 | -8.4 | -10.6 | -23.8 |
| | B14#4 | -24.6 | -12.9 | -15.2 | -22.6 |
| Adjacent Sector ALPHA Tx Antenna Port | B17#1 | - | - | - | - |
| | B17#2 | - | - | - | - |
| | | | | | |
| | B14#1 | - | - | - | - |
| | B14#2 | - | - | - | - |
| | B14#3 | - | - | - | - |
| | B14#4 | - | - | - | - |
| Primary Sector BETA Tx Antenna Port | B17#1 | - | - | - | - |
| | B17#2 | - | - | - | - |
| | | | | | |
| | B14#1 | - | - | - | - |
| | B14#2 | - | - | - | - |
| | B14#3 | - | - | - | - |
| | B14#4 | - | - | - | - |

DETECTION AND CHARACTERISATION OF PASSIVE INTERMODULATION AT A MIMO ANTENNA ARRAY

CROSS-REFERENCE TO RELATED APPLICATIONS

This application claims the benefit under 35 U.S.C. § 119(a) and 37 CFR § 1.55 to United Kingdom patent application no. GB 1902504.8 filed on Feb. 25, 2019, the entire content of which is incorporated herein by reference.

BACKGROUND OF THE INVENTION

Field of the Invention

The present invention relates generally to detection of interference due to intermodulation products of transmitted signals in a wireless system, and more specifically, but not exclusively, to detection and characterisation of Passive Intermodulation (PIM) intermodulation interference at a Multiple Input Multiple Output (MIMO) antenna array comprising a first group of antennas for operation in a first band and a second group of antennas for operation in a second band, and to a MIMO PIM analysis test set for detecting and characterising passive intermodulation interference at a MIMO antenna array.

Description of the Related Technology

Intermodulation products may be generated in a wireless system when two or more signals are transmitted at different frequencies along a signal path including a component having a non-linear transmission characteristic; these products differ in frequency from the signals from which they were generated, and may potentially cause interference to other signals. The generation of intermodulation products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, 5G NR (New Radio), and by various operators, is complex and territorially dependent. In this environment, and in particular at a cellular radio base station, it is likely that circumstances arise in which intermodulation products generated from transmitted carriers in one or more downlink bands would fall within an uplink band in which signals are received at the base station. Intermodulation generated by non-linear characteristics of active components such as power amplifiers may generally be dealt with at a design stage by appropriate frequency management and filtering, but intermodulation caused by non-linear characteristics of passive components, so called passive intermodulation (PIM), may prove more difficult to manage. Many passive components may exhibit a non-linear transmission characteristic to some degree, for example due to an oxide layer at a metal to metal contact, and the non-linear characteristic may develop with time as an ageing process of the component, for example an antenna. Furthermore, PIM may be caused by components in the signal path between the transmitter and the receiver that are external to the transceiver equipment, for example mounting brackets at an antenna tower.

Increasingly, cellular and other wireless systems use MIMO (Multiple Input, Multiple Output) radio frequency transmission, in which a node such as a base station or a user equipment may have more than one antenna and may transmit and/or receive different signal component streams from each antenna at the same frequency. The node may be in communication with another node which also has more than one antenna and which may also be arranged to transmit and/or receive different signal component streams from each antenna at the same frequency. This may enable an increase in system capacity in some propagation conditions by allowing multiple signal component streams to be transmitted between the nodes at the same frequency. If two or more MIMO signal component streams at the same frequency impinge upon a passive non-linear device together with one or more MIMO signal component streams at a second frequency, then the PIM generated by interaction between signals at the first and second frequencies is typically the combination of the PIM components generated by interaction between various of the MIMO signal component streams.

Interference due to PIM may reduce the carrier to interference ratio at a receiver, which may reduce coverage by a cell significantly. It may be desired to detect the interference due to PIM so that mitigating action may be taken, such as the replacement of faulty equipment. It is known to detect PIM generated from MIMO signals by generating a replica of the MIMO PIM and correlating this with received signals, as described for example in the applicant's patent GB2502281. This may detect the presence of MIMO PIM in the received signals, but provides little further information characterising interference for a MIMO antenna array.

It is an object of the invention to address at least some of the limitations of the prior art detection systems.

SUMMARY

In accordance with a first aspect of the present invention, there is provided a method of detecting and characterising passive intermodulation interference at a MIMO antenna array comprising a first group of antennas for operation in a first band and a second group of antennas for operation in a second band, the method comprising:

receiving first digital signals representing respective first MIMO signal components transmitted at a first carrier frequency from each antenna of the first group of antennas and receiving second digital signals representing respective second MIMO signal components transmitted at a second carrier frequency from each antenna of the second group of antennas;

receiving third digital signals representing signals received at an antenna under analysis comprising interference generated by intermodulation between the first MIMO signal components and the second MIMO signal components;

processing the first digital signals and the second digital signals to determine a plurality of partial simulated PIM signals, each partial simulated PIM signal being generated from samples of a respective one of the MIMO signal components transmitted from one group of the first and second groups of antennas and from samples of all of the MIMO signal components transmitted from the other group of the first and second groups of antennas; and determining a magnitude of a cross-correlation between the third digital signals representing signals comprising interference received at the given antenna and each of the plurality of partial simulated PIM signals.

The magnitude of a cross-correlation between the third digital signals representing signals comprising interference received at the given antenna under analysis and each of the plurality of partial simulated PIM signals is a useful measurement that may be used in analysis of the cause of the PIM at the MIMO antenna array. This allows a determination to be made as to which antennas are likely to have transmitted signals which contributed most to the generation of the received PIM interference at the given antenna, and therefore where the source of the PIM may be.

In an embodiment of the invention, the method comprises generating an output indicative of the magnitudes of the determined cross-correlations.

This allows a user or an automatic analysis system to have access to the magnitudes of the cross-correlations.

In an embodiment of the invention, the output is a digitally encoded electronic signal This allows a display or a signal processor to have access to the magnitudes of the cross-correlations.

In an embodiment of the invention, the output is displayed on a graphical user interface.

This provides an efficient interface to a user of a MIMO PIM test set.

In an embodiment of the invention, the plurality of partial simulated PIM signals comprises a plurality of first partial simulated PIM signals each generated from samples of a respective one of the first MIMO signal components and samples of all of the second MIMO signal components, and a plurality of second partial simulated PIM signals each generated from samples of a respective one of the second MIMO signal components and samples of all of the first MIMO signal components, and the method comprises:

normalising the outputs indicative of the magnitudes of the determined cross-correlations such that the greatest magnitude of the determined cross-correlations for the first band has substantially the same value as the greatest magnitude of the determined cross-correlations for the second band.

This allows a fair comparison to be made between the contributions from MIMO signal components in the two bands.

In an embodiment of the invention, the method comprises processing the normalised outputs indicative of the magnitudes of the determined cross-correlations to determine a relative level of contribution to the PIM interference at the given antenna from each MIMO component.

This allows a comparison to be made between the contributions from MIMO signal components, from which may be deduced the source of the PIM.

In an embodiment of the invention, the method comprises determining, from the relative level of contribution to the PIM interference at the given antenna from each MIMO component, the relative level of contribution to the PIM interference at the given antenna from each transmit antenna.

Linking each MIMO component with the antenna from which it was transmitted provides an indication of which antenna or antennas may be the source of the PIM.

In an embodiment of the invention, the method comprises:

processing the first digital signals and the second digital signals to determine a composite simulated PIM signal generated from samples of all of the MIMO signal components transmitted from each of the first and second groups of antennas;

determining a magnitude of a cross-correlation between the third digital signals representing interference received at the given antenna and the composite simulated PIM signal and comparing the magnitude to a first threshold to determine whether the given antenna passes or fails a PIM interference test; and dependent on the given antenna failing the PIM interference test, comparing the relative level of contribution to the PIM interference at the given antenna from each transmit antenna to a second threshold to determine which transmit antenna or antennas contribute significantly to the PIM interference at the given receive antenna.

Generating the composite simulated PIM signal and cross-correlating it with the received signal gives a detection of total PIM level. Eliminating receive antennas from the test which have less than a threshold level of PIM interference saves test time and provides a useful test output.

In an embodiment of the invention, the method comprises generating an output indicating which transmit antenna or antennas contribute significantly to the PIM interference at the given receive antenna.

This provides a useful diagnostic output for locating a source of PIM.

In an embodiment of the invention, at least one antenna is a member of both the first group of antennas and the second group of antennas and is configured to operate at both the first band and the second band.

In some installations the same physical antenna may be configured for operation in two bands.

In an embodiment of the invention, at least one of the first group of antennas and the second group of antennas comprises at least one antenna providing coverage to a first cellular sector and at least one antenna providing coverage to a second cellular sector.

This allows a determination as to whether a MIMO signal component from another sector, typically transmitting in a different direction, is contributing to generating PIM in a given sector.

In accordance with a second aspect of the invention there is provided a MIMO PIM analysis test set for detecting and characterising passive intermodulation interference at a MIMO antenna array comprising a first group of antennas for operation in a first band and a second group of antennas for operation in a second band, the apparatus comprising:

one or more receiver for receiving:

first digital signals representing respective first MIMO signal components transmitted at a first carrier frequency from each antenna of the first group of antennas.

second digital signals representing respective second MIMO signal components transmitted at a second carrier frequency from each antenna of the second group of antennas, and third digital signals representing signals received at an antenna under analysis comprising interference generated by intermodulation between the first MIMO signal components and the second MIMO signal components; and a processor configured to:

process the first digital signals and the second digital signals to determine a plurality of partial simulated PIM signals, each partial simulated PIM signal being for intermodulation between a respective one of the MIMO signal components transmitted from one group of the first and second groups of antennas and all of the MIMO signal components transmitted from the other group of the first and second groups of antennas;

determine a magnitude of a cross-correlation between the third digital signals representing signals comprising interference received at the given antenna and each of the plurality of partial simulated PIM signals; and generate an output indicative of the determined cross-correlations.

In an embodiment of the invention, the one or more receivers for receiving the first, second and third digital signals are optical receivers for receiving digital signals from an optical fibre.

In an embodiment of the invention, the optical receivers are for connection to optical taps inserted into respective CPRI connections between a baseband unit and a radio head at a cellular wireless base station.

This provides a convenient method of intercepting, at baseband, signals transmitted and received by the MIMO antenna array.

In an embodiment of the invention, the PIM analysis test set comprises a graphical user interface configured to display a representation of the output indicative of the determined cross-correlations.

Further features and advantages of the invention will be apparent from the following description of preferred embodiments of the invention, which are given by way of example only.

DETAILED DESCRIPTION OF CERTAIN INVENTIVE EMBODIMENTS

By way of example, embodiments of the invention will now be described in the context of detection of interference caused by passive intermodulation (PIM) in cellular wireless networks such as GSM, 3G (UMTS) and LTE networks comprising GERAN, UTRAN and/or E-UTRAN radio access networks, but it will be understood that embodiments of the invention may relate to other types of radio access network, for example 5G NR (New Radio) networks, and that embodiments of the invention are not restricted to cellular wireless systems.

Figure 1:
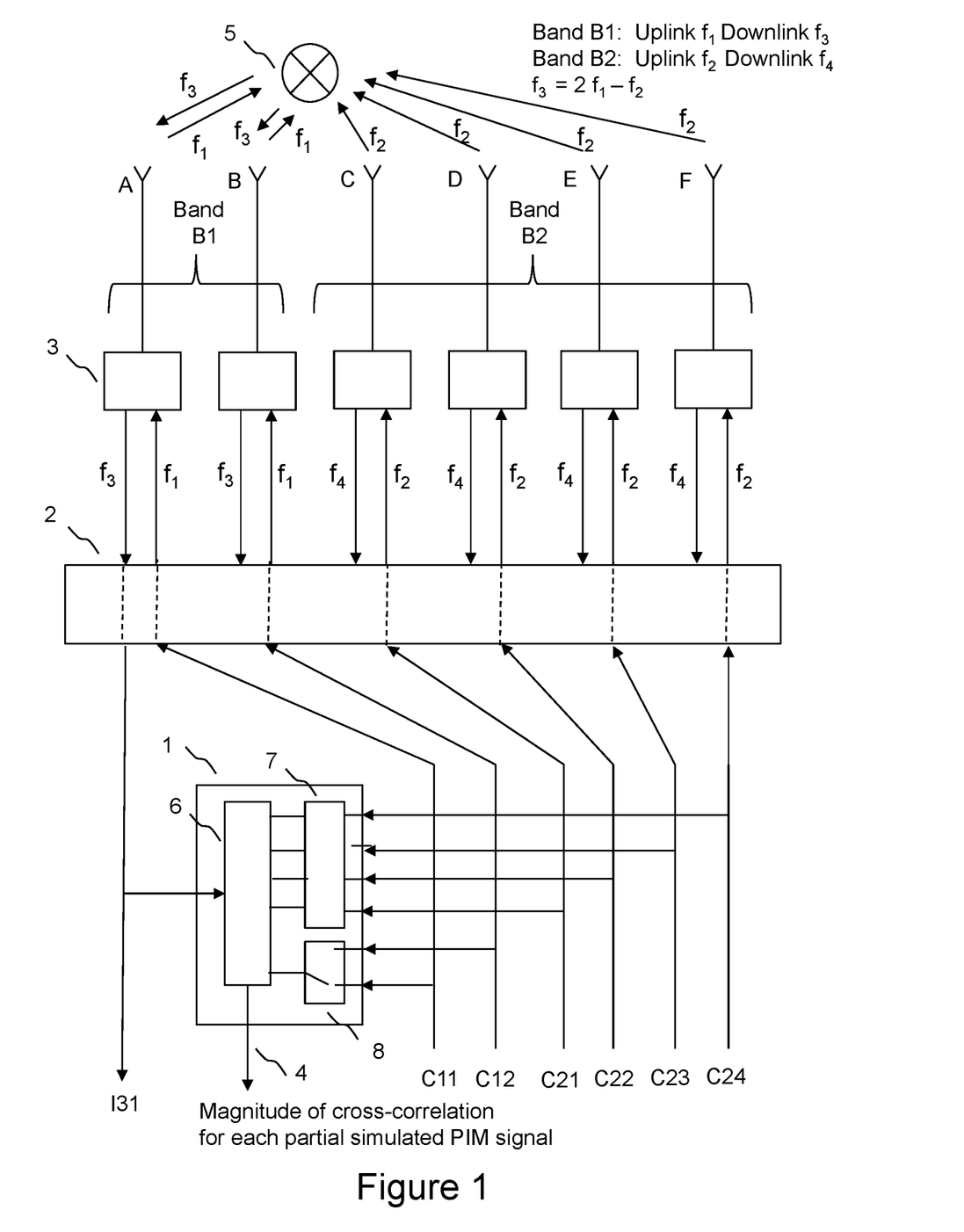
FIG. 1 is a schematic diagram illustrating a MIMO antenna array experiencing interference from a PIM source at a base station for a cellular wireless network and a PIM analysis test set connected to fibres carrying uplink and downlink signals, showing an input selector for the PIM analysis test set in a first state.

FIG. 1 is a schematic diagram illustrating a MIMO antenna array having antennas A to F, experiencing interference from a PIM source 5 at a base station for a cellular wireless network and a MIMO PIM analysis test set 1 connected to fibres carrying uplink and downlink signals to and from a radio head 2. The location of the PIM source is typically not known, and may be in the feed network, or in or near one or more of the antennas, or may be external to the base station equipment. In this example, each antenna is used for both transmit and receive, and is connected to a respective diplexer 3 to separate transmit and receive signals. In the example shown in FIG. 1, there are two groups of antennas, antennas A and B being configured to transmit and receive in respective downlink and uplink bands within a first band B1, and antennas C, D, E and F being configured to transmit and receive in respective downlink and uplink bands within a second band B2. The designation B1 and B2 in this example are arbitrary reference symbols. In this example, signals are transmitted at carrier frequency f1 in band B1 and f2 in band B2, and received at carrier frequency f3 in band B1 and f4 in band B2. In this example, the relative spacing of the bands is assumed such that third order intermodulation PIM products of the form 2f1-f2, or 2f2-f1, may be generated at a receive frequency in the first band at frequency f3. In other examples, the PIM may be generated by products of signals in the two band of various orders, not necessarily third order, and may be a harmonic of signals in only one band. It will be understood that there are many different non-linear products of two or more signals which may produce PIM, in both upper and lower sidebands. However, typically only a subset of possible generated PIM products happen to fall in a given receive band to cause interference. Most PIM products can simply be rejected by filtering. In a given antenna installation, for example at a cellular wireless base station, it can be predicted which combinations of transmitted signals and orders of PIM products may be troublesome to a given receive band. It is possible to generate simulated PIM products of the expected orders from baseband representations of the transmitted signals and sum them together to produce simulated PIM signals, which may be expected in the receive band if PIM is indeed present. The received signals in a given receive band of interest may then be cross-correlated with these simulated PIM signals to detect whether the PIM is actually there. To get a good correlation, the frequency offset, delays, and relative phases of the simulated PIM signals may need to be adjusted to match those of the actual PIM in the received signals. This may, for example, be achieved by a search over a range of values, for example as described in the applicant's patent GB2502281.

As shown in FIG. 1, there are two antennas in one band and four in another band. This is just an example, and each band may have 2 or more antennas for MIMO operation, and there may be more than two bands. In the example shown, the antennas are assumed to be in an array providing MIMO transmission in a given cellular antenna sector. Typically, cellular wireless networks are arranged with three sectors at each cell site, each covering approximately 120 degrees of azimuth, but other arrangements are possible. Signals for one or more antennas from different sectors may be connected to the MIMO PIM test set.

By way of an example, one band may be the FDD band designated B14, having an uplink at 788-798 MHz and a downlink at 758-768 MHz, and another band may be the FDD band designated B17, having an uplink at 788-798 MHz and a downlink at 758-768 MHz.

As shown in FIG. 1, digital signals representing, at baseband in Inphase and Quadrature (IQ) format, respective MIMO signal components C11, C12, C21, C22, C23, C24 for transmission from the antennas are connected to the radio head 2. The radio head converts the IQ digital signals to analogue form and upconverts the signals for transmission from respective antenna A to F. The radio head 2 also downconverts signals received at the antennas and converts them to digital IQ form. In the example of FIG. 1, only one receive path is shown, from antenna A, to simplify the description of operation, However, each of the antennas is typically connected via the radio head to a respective IQ baseband output. The baseband inputs and outputs are typically carried by optical fibres. Typically the optical fibres run from a baseband unit, typically located on the ground at a cell site, to the radio head, which is typically located on a tower at a cell site nearer to the antennas.

FIG. 1 illustrates the characterisation of MIMO PIM received at antenna A of the MIMO antenna array. It will be understood that a corresponding process may be performed for each of the other antennas.

As shown in FIG. 1, the MIMO PIM analysis test set 1 receives first digital signals C11, C12 representing respective first MIMO signal components transmitted at a first carrier frequency f1 from each antenna of the first group of antennas and receives second digital signals C21, C22, C23, C24 representing respective second MIMO signal components transmitted at a second carrier frequency f2 from each antenna of the second group of antennas. The digital signals are typically carried by optical fibres, and are received by optical receivers, for example in a sensor unit, and converted to digital electronic form. Optical taps may be inserted into the Common Public Radio Interface (CPRI) connections between a baseband unit and the radio head to intercept the optical signals.

Also as shown in FIG. 1, third digital signals are received at the MIMO PIM analysis test set 1 representing signals received at a given antenna (in this example antenna A) of the first group of antennas comprising interference generated by intermodulation between the first MIMO signal components and the second MIMO signal components. The third digital signals are typically also obtained by optical taps connected into the CPRI fibres via a sensor unit. The given antenna, which may be referred to as the antenna under analysis, may be an antenna from the first group of antennas, or the second group of antennas, or in other embodiments the antenna under analysis may be an antenna in the MIMO antenna array that is not in the first group of antennas or the second group of antennas. The antenna under analysis may be for operation in another band that is not either the first or second band. In other embodiments, the antenna under analysis may be an antenna that is not part of the MIMO antenna array. The first second and third digital signals may represent one or more frames of CPRI baseband IQ data, representing the signals transmitted and received from the antennas as appropriate. The frames of data may be stored and processed in non-real time. However, the receive and transmit data should correspond to data transmitted and received in the same time interval.

The MIMO PIM analysis test set 1 processes the first digital signals and the second digital signals to determine a plurality of partial simulated PIM signals, each partial simulated PIM signal being generated from samples of a respective one of the MIMO signal components transmitted from one group of the first and second groups of antennas and from samples of all of the MIMO signal components transmitted from the other group of the first and second groups of antennas. This process is illustrated by FIG. 1 in combination with FIG. 2. FIG. 1 shows a first step in which a first selector function 8 selects only one MIMO signal component (in the illustrated example C11) transmitted from the first group of antennas (band B1) and a second selector function 7 selects all of the MIMO signal components C21, C22, C23, C24 transmitted from the other group of antennas (band B2). The selected components are passed to a signal processing function 6, in which partial simulated PIM signals are generated from the selected signal components. Typically, each possible contribution to the expected order of PIM is generated from the selected components and this is summed together to produce the partial simulated PIM signal. So, each permutation of selected components at f1 with selected components at f2 is generated, and the permutations are summed together to produce the partial simulated PIM signal. In this example the partial simulated PIM signal is for contributions from only antenna A at f1, and from all of the antennas C, D, E and F at f2.

As a second step, the partial simulated PIM signal is generated for contributions from only antenna B at f1, and from all of the antennas C, D, E and F at f2, by selecting only C12 at selector function 8, and selecting all the components C21, C22, C23, C24 at selector function 7. Again, each permutation of selected components at f1 with selected components at f2 is generated, and the permutations are summed together to produce the partial simulated PIM signal for antenna B.

Figure 2:
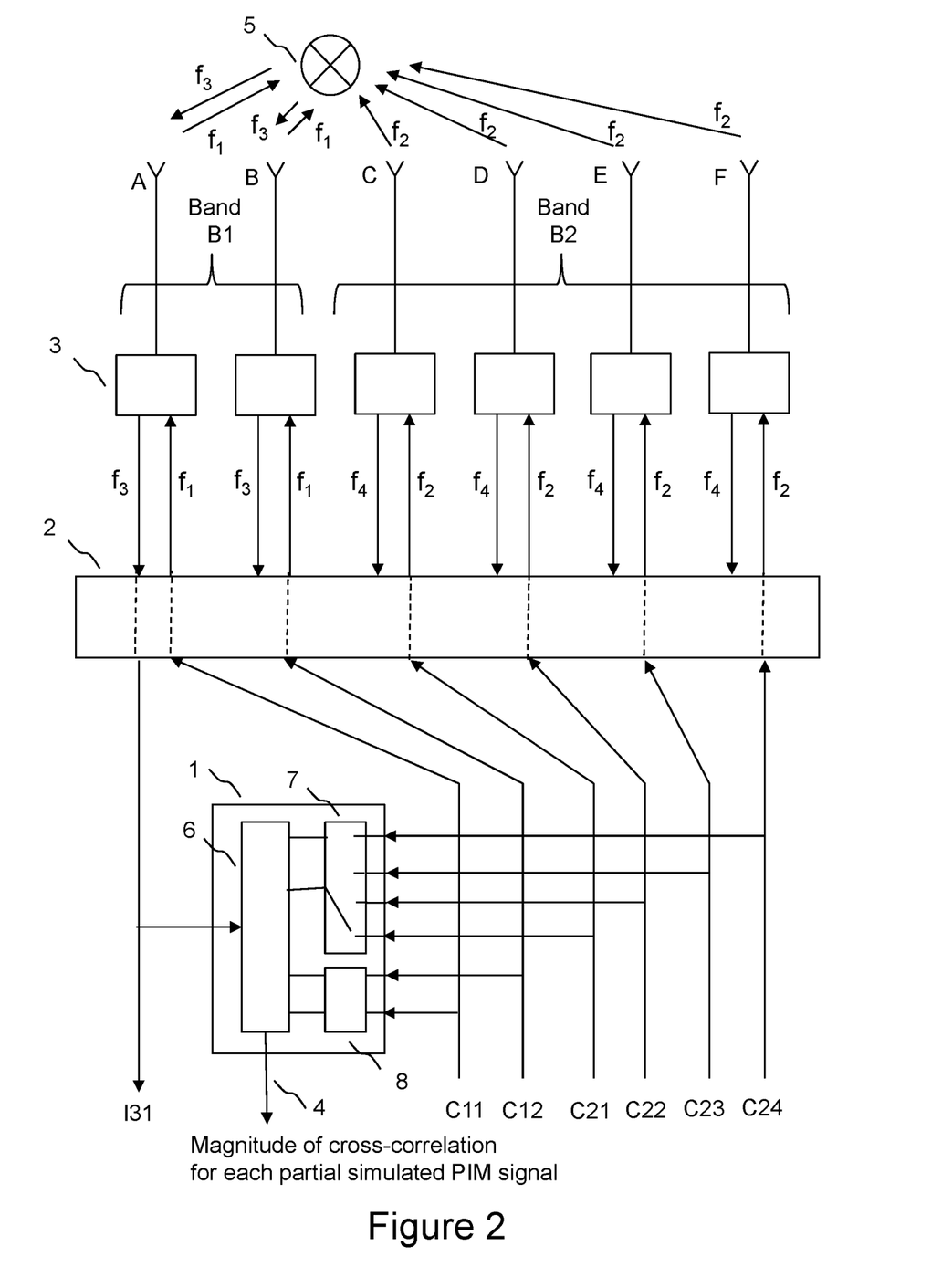
FIG. 2 is a schematic diagram illustrating a MIMO antenna array experiencing interference from a PIM source at a base station for a cellular wireless network and a PIM analysis test set connected to fibres carrying uplink and downlink signals, showing an input selector for the PIM analysis test set in a second state.

As a third step, as illustrated by FIG. 2, the partial simulated PIM signal is generated for contributions from only antenna C at f2, and from all of the antennas A and B at f1, by selecting only C21 at selector function 7, and selecting both of the components C11 and C12 at selector function 8. Again, each permutation of selected components at f1 with selected components at f2 is generated, and the permutations are summed together to produce the partial simulated PIM signal for antenna C.

The process is then repeated to produce the partial simulated PIM signal for each of antennas D, E and F.

Then a magnitude is determined, in signal processing function 6, of a cross-correlation between the third digital signals representing signals comprising interference received at the given antenna and each of the plurality of partial simulated PIM signals.

An output 4 indicative of the magnitudes of the determined cross-correlations may then be generated, for example a digitally encoded electronic signal, and the output may be displayed on a graphical user interface. The magnitude of a cross-correlation between the third digital signals representing signals comprising interference received at the given antenna and each of the plurality of partial simulated PIM signals is a useful measurement that may be used in analysis of the cause of the PIM received at the MIMO antenna array. This allows a determination to be made as to which antennas are likely to have transmitted signals which contributed most to the generation of the received PIM interference at the given antenna, and therefore where the source of the PIM may be.

The steps described so far relate to generating partial simulated PIM signal for transmissions from each of antennas A, B, C, D, E and F, as received at the given antenna, antenna A. The process may then be repeated to generate partial simulated PIM signal for transmissions from each of antennas A, B, C, D, E and F, as received at each of the other antennas, in this example antennas B, C, D, E and F.

Figure 3:
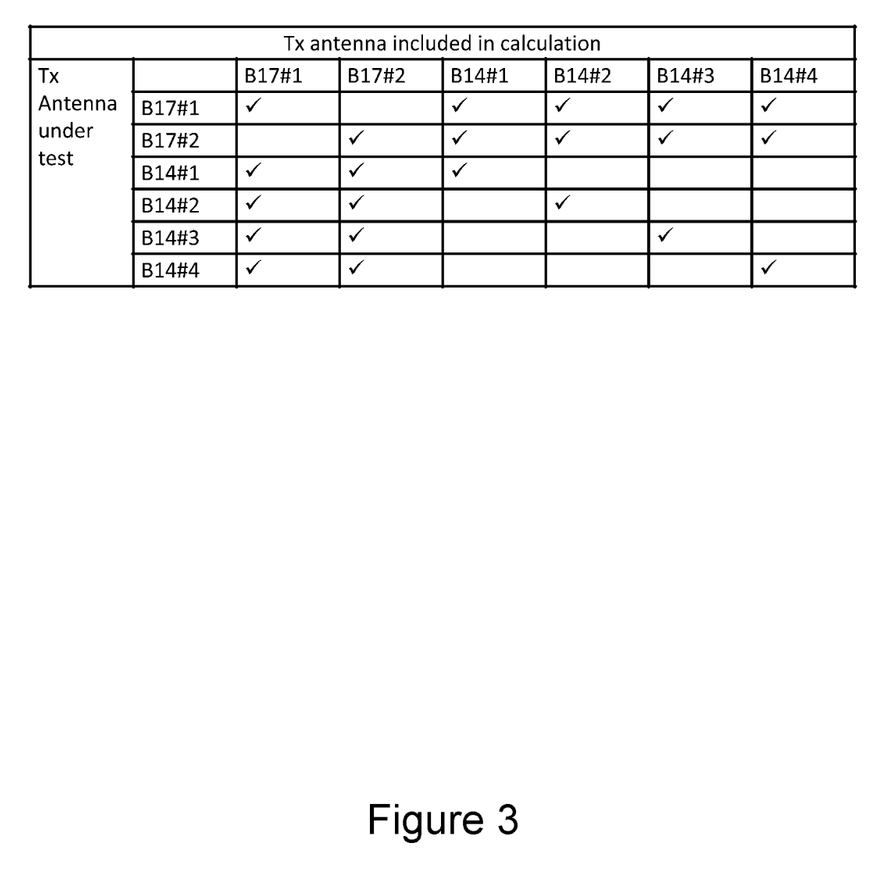
FIG. 3 is a table showing an example of combinations of antennas used to generate the partial simulated PIM signals for LTE bands B14 and B17 in an deployment having two antennas in the B17 band and 4 antennas in the B14 band for a given sector.

FIG. 3 illustrates an example of combinations of antennas used to generate the partial simulated PIM signals for LTE bands B14 and B17 in a deployment having two antennas in the B17 band and 4 antennas in the B14 band for a given sector, in an example. This shows that, in this example, there are 6 partial simulated PIM signals generated, to be correlated with received signals for each receive antenna (receive antenna not specified in table).

Figure 4:
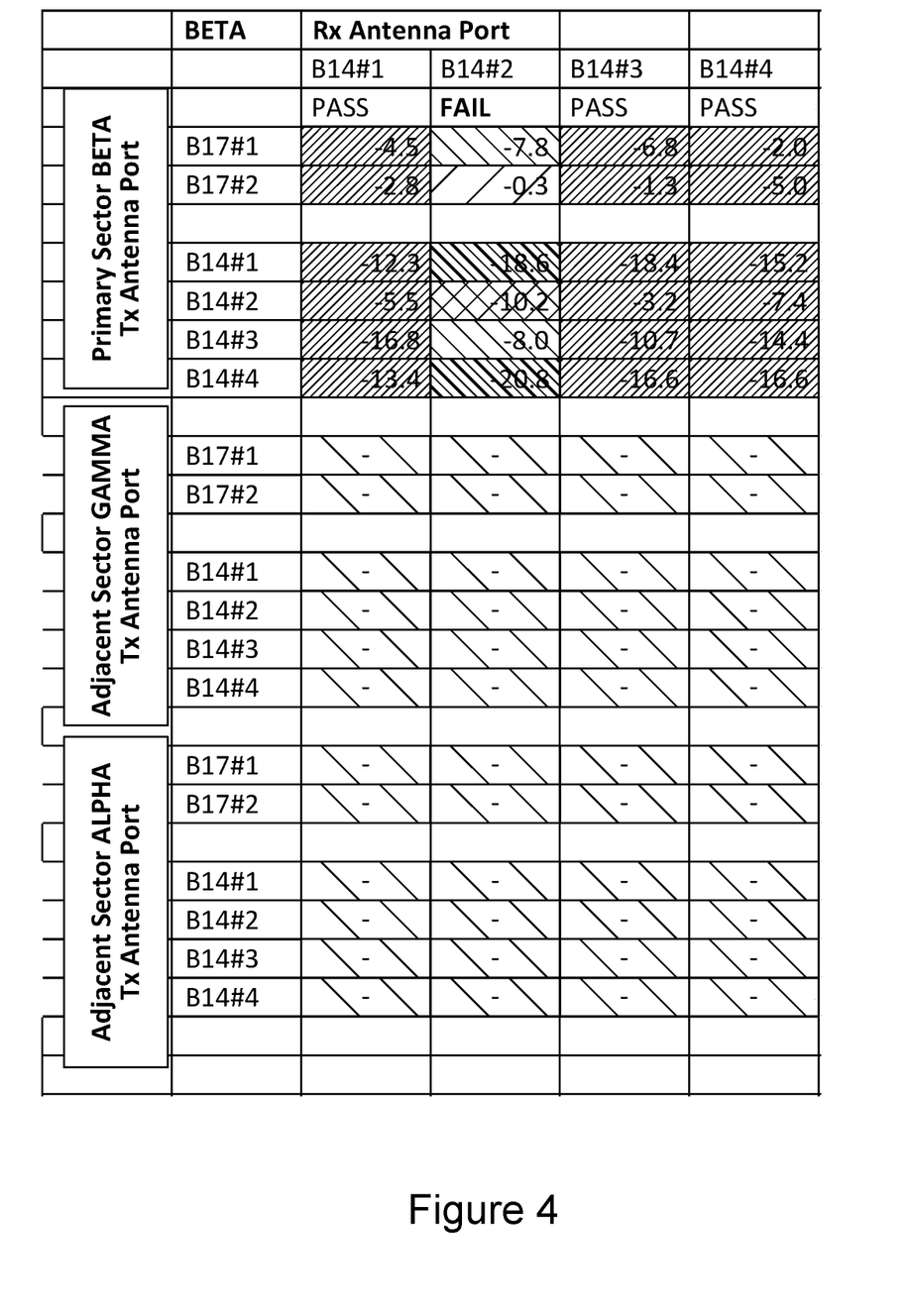
FIG. 4 is an example of a graphical user interface display providing outputs indicative of determined cross-correlations of partial simulated PIM signals with a received signals for antenna 2 of band B14 in sector "Beta"
Figure 5:
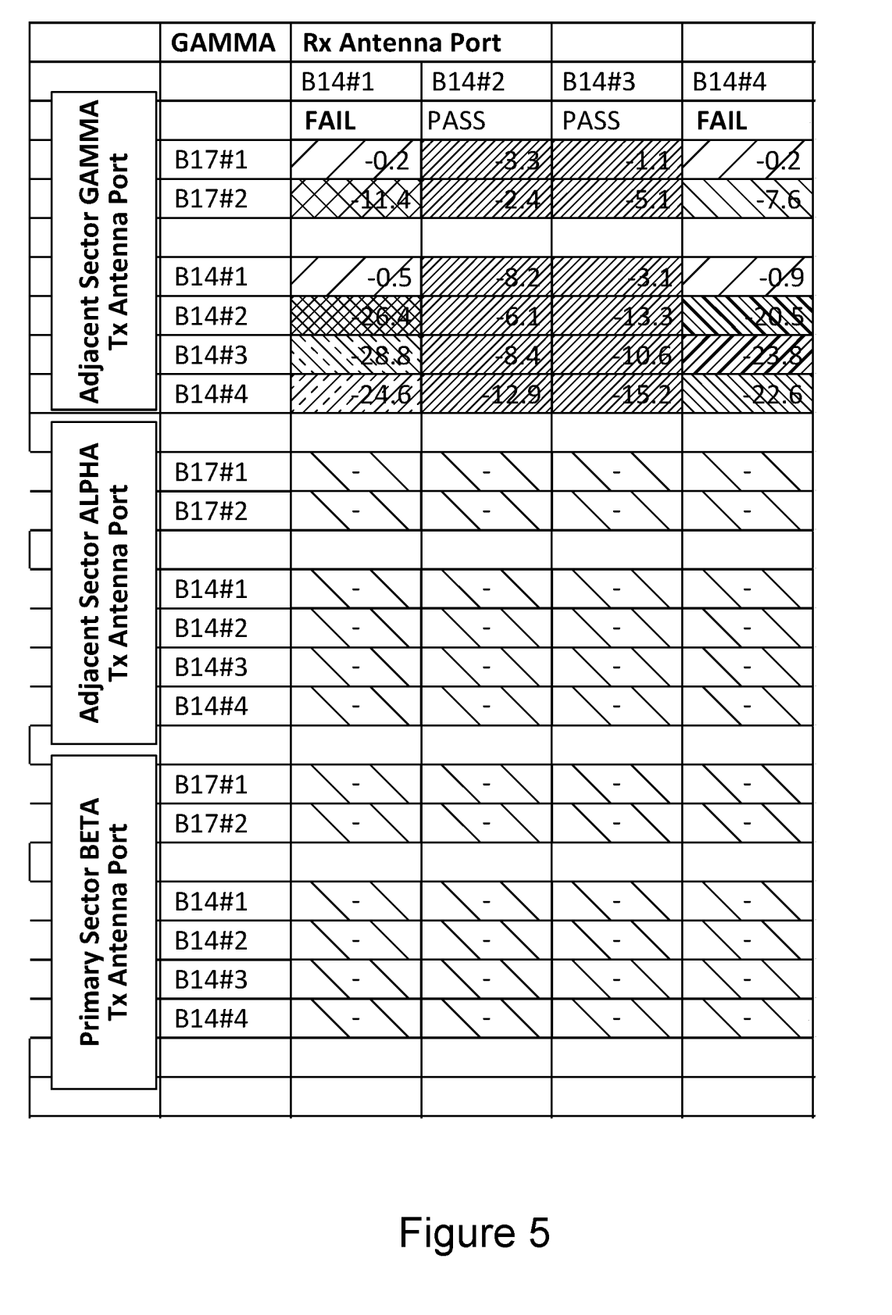
FIG. 5 is an example of a graphical user interface display providing outputs indicative of determined cross-correlations of partial simulated PIM signals with a received signals for antennas 1 and 4 of band B14 in sector "Gamma"

FIG. 4 is an example of a graphical user interface display providing outputs indicative of determined cross-correlations of partial simulated PIM signals with a received signals for antenna 2 of band B14 in sector "Beta"; FIG. 5 is another example, for antennas at a different sector "Gamma", showing the cross-correlations of partial simulated PIM signals with a received signals, in this example for signals received at antennas 1 and 4 of band B14.

It can be seen that in these examples, the magnitude of the cross-correlations with the partial simulated PIM signals is shown as a dB figure, which may be in relation to a correlation with a composite, i.e. total, simulated PIM signal including PIM contributions from all transmit antennas as a reference level of 0 dB. As may be seen, this output provides a useful tool to an engineer investigating a PIM problem at the antenna array. In this case, results are highlighted only for PIM received at one antenna, B14 #2. This is because the other antennas in band B14 were found to have total PIM below a predetermined threshold of acceptability, and were so declared to pass a PIM test and no further investigation is deemed to be necessary. The results for the antennas that pass the test are therefore greyed out in this example of the display. The results for the receive antenna that failed the test are highlighted for display. For the antenna that failed the test, the magnitude of the cross-correlations with the partial simulated PIM signals may be displayed with colours from a heat map, typically with the red end of the scale being set for the highest magnitudes. This provides an efficient user interface, so that the antenna giving the greatest contribution to the PIM may be seen at a glance.

In the example of FIG. 4, it can be seen that the dominant contributions to the PIM are from antenna B17 #2 in band B17, and from antennas B14 #2 and B14 #3 in band B14. It may be deduced that the contribution from B17 #2 is highly dominant, so that there may be an internal fault in this antenna. Also, B14 #2 and B14 #3 contribute to the PIM. It may be that they share an antenna facet with B17 #2.

Turning now to the example of FIG. 5, for a different set of antennas than that used for the results of FIG. 4, it can be seen that in this case two receive antennas have failed the composite PIM test by having a correlation of the composite PIM above an acceptable threshold. It can be seen that in this example, for both receive antennas, the dominant contribution to the PIM is from antenna B17 #1 at band B17 and B14 #1 at band B14. It may be that B17 #1 and B14 #1 share an antenna feed or facet. In that case, the PIM may be diagnosed as being internal to the antenna feed or facet.

FIGS. 4 and 5 are examples only, and other diagnoses may be determined in other cases. For example if the contributions to the PIM from the transmit antennas is equal within a predetermined range, it may be conclude that the PIM source is outside the antenna array.

The magnitude of the cross-correlations with the partial simulated PIM signals may be interpreted by an operator once displayed, or sent in electronic form to a network management centre or other processor for automatic diagnosis of PIM problems according to predetermined rules or rules determined by machine learning.

Interpretation of the results may be facilitated by normalisation of the outputs indicative of the magnitudes of the determined cross-correlations. For example, the magnitudes for each group may be normalised so that the greatest magnitude in each group is set to the same value. This may be done as follows. The plurality of partial simulated PIM signals may be divided into a plurality of first partial simulated PIM signals each generated from samples of a respective one of the first MIMO signal components and samples of all of the second MIMO signal components, and a plurality of second partial simulated PIM signals each generated from samples of a respective one of the second MIMO signal components and samples of all of the first MIMO signal components. The outputs indicative of the magnitudes of the determined cross-correlations may be normalised so that the greatest magnitude of the determined cross-correlations for the first band has substantially the same value as the greatest magnitude of the determined cross-correlations for the second band. This allows a fair comparison to be made between the contributions from MIMO signal components in the two bands.

The normalised outputs indicative of the magnitudes of the determined cross-correlations may be processed to determine a relative level of contribution to the PIM interference at the given antenna from each MIMO component, to allow a comparison to be made between the contributions from MIMO signal components, from which may be deduced the source of the PIM.

Linking each MIMO component with the antenna from which it was transmitted provides an indication of which antenna or antennas may be the source of the PIM.

As already mentioned, a measurement may be made of a total level of PIM, for comparison with the partial simulated PIM signals. This may be achieved by processing the first digital signals and the second digital signals to determine a composite simulated PIM signal generated from samples of all of the MIMO signal components transmitted from each of the first and second groups of antennas. A magnitude may be determined of a cross-correlation between the third digital signals representing interference received at the given antenna and the composite simulated PIM signal and comparing the magnitude to a first threshold to determine whether the given antenna passes or fails a PIM interference test. Dependent on the given antenna failing the PIM interference test, comparing the relative level of contribution to the PIM interference at the given antenna from each transmit antenna to a second threshold to determine which transmit antenna or antennas contribute significantly to the PIM interference at the given receive antenna. Generating the composite simulated PIM signal and cross-correlating it with the received signal gives a detection of total PIM level. Eliminating receive antennas from the test which have less than a threshold level of PIM interference saves test time and provides a useful test output. An output may be generated indicating which transmit antenna or antennas contribute significantly to the PIM interference at the given receive antenna.

In some installations the same physical antenna may be configured for operation in two bands.

In an embodiment of the invention, at least one of the first group of antennas and the second group of antennas comprises at least one antenna providing coverage to a first cellular sector and at least one antenna providing coverage to a second cellular sector. This allows a determination as to whether a MIMO signal component from another sector, typically transmitting in a different direction, is contributing to generating PIM in a given sector.

Figure 6:
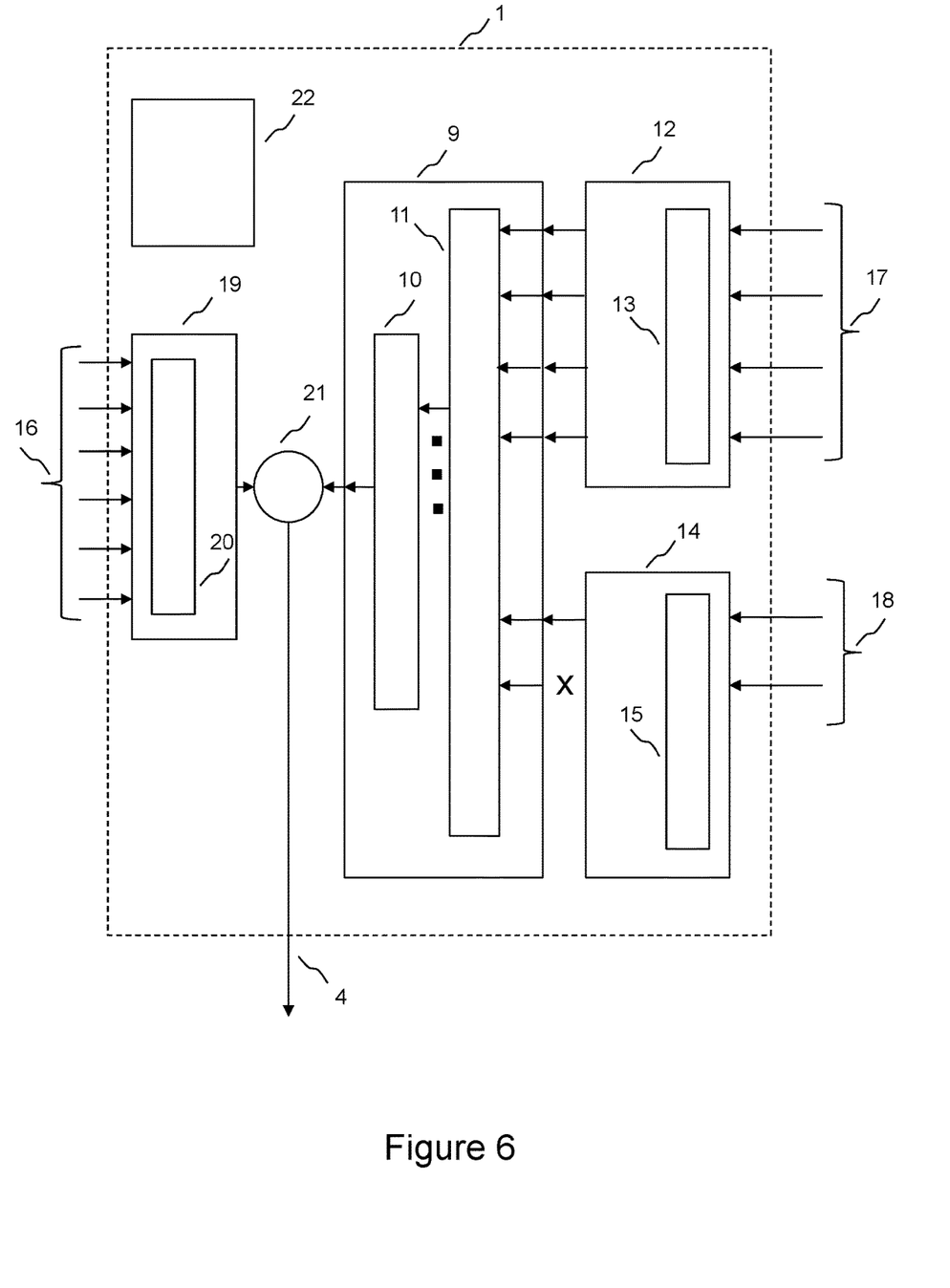
FIG. 6 is a schematic diagram showing the MIMO PIM analysis test set.

FIG. 6 is a schematic diagram showing an example of the MIMO PIM analysis test set 1. Optical receivers 12, 14 and 19 are provided to interface with optical fibres 16, 17, 18 which are tapped off from optical fibres of the CPRI links which provide signals for transmission and reception to and from the radio head at the cell site. On each fibre, the waveform to be transmitted or that has been received is represented in baseband inphase and quadrature form. The optical receivers convert the received digital optical signals into electronic form. The electronic signals may be stored in buffers 13, 15, 20, representing bursts of transmitted and received signals for the same timeframe. A digital signal processor function 9 has a selector function 11 which selects a subset of transmit antenna MIMO signal components to be passed to a partial simulated PIM signal generation function 10, which may generate the partial simulated PIM signal from PIM components for each permutation of MIMO signal components for the frequency band contributing to the order of PIM being simulated. Alternatively, a combined signal for the PIM components at each frequency, the combined signal being represented at baseband, may be passed through a non-linear function to produce the simulated PIM.

Each partial simulated PIM signal is cross-correlated, using cross-correlation function 21, with the signals representing the received signal at a given antenna. An indication of the magnitude of the cross-correlation for each partial simulated PIM signal for a signal received from each receive antenna is then output 4. This may be displayed on a graphical user interface or connected to an electronic processor or storage device. The process may be controlled by a control processor 22.

The digital signal processing functions may be implemented by a processor using a variety of well-known techniques, including by implementation in signal processing chips, by gate array logic, and by software on a general purpose computer.

Figure 7:
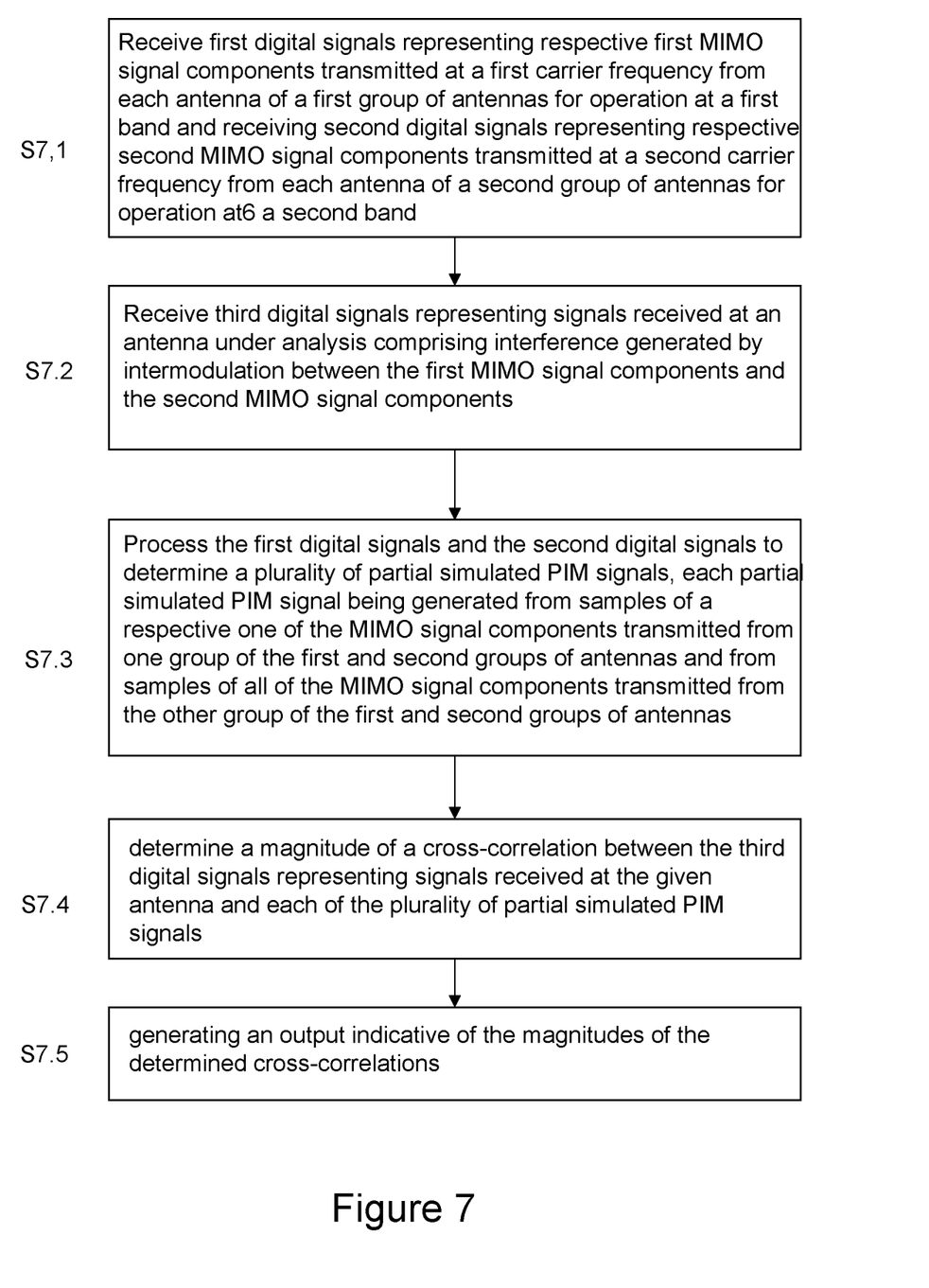
FIG. 7 is a flow diagram of steps of a method in an embodiment of the invention.

FIG. 7 is a flow diagram of steps of a method in an embodiment of the invention according to Steps S7.1 to S7.5.

In embodiments of the invention, a replica may be built of the PIM using all the likely contributing transmitting antennas, which may be referred to as a composite simulated PIM signal, and also replicas may be built, which may be referred to as partial simulated PIM signals, which each lack contributions from one or more possible contributing antennas, or which have the contributions removed. The ratio of detected PIM power between the partial set and the full set may give a measure of the importance of the contribution to the PIM interference by any given antenna. The detected PIM power of a replica may be found by cross-correlation between the replica and a received signal, which may contain a wanted signal in addition to PIM interference. An antenna that contributes significantly might be expected to be in close proximity to the major source or sources of PIM whilst an antenna that contributes little or nothing to the PIM measurement might be assumed to be distant or obscured from the source. If antennas contribute quite equally to the measurement the source may be some distance behind or in front of all the antennas. If it is behind, it is likely that adjacent sectors antennas will show a significant contribution. The information can be visualised by means of a heat map, either just in table form, or if the physical layout of the antennas is known, as a heat map in a spatial diagram.

The processing of the MIMO signal components at baseband to produce simulated PIM products, which may be summed together to produce composite or partial simulated PIM signals, may be carried out as follows. Consider, for example, generation of power (exponent) 3 intermodulation products of two signals, having amplitude modulation A and B respectively, and a phase comprising carrier phase and phase modulation a and b respectively. For example, one signal may be a MIMO signal component in one band, and the other signal may be a MIMO signal component in another band. Exponent 3 intermodulation products are given by:

$$(A\cos(a)+B\cos(b))^3$$

which may be expanded to give:

$$\tfrac{1}{4}(3A^3\cos(a)+A^3\cos(3a)+3A^2B\cos(2a-b)+3A^2B\cos(2a+b)+AB^2\cos(a-2b)+3AB^2\cos(a+2b)+6AB^2\cos(a)+6A^2B\cos(b)+3B^3\cos(b)+B^3\cos(3b))$$

The terms of the expansion which are of interest, in that they may fall in an uplink receive band, are the terms $3A^2B\cos(2a-b)$, which represents the lower third order product and $3AB^2\cos(a-2b)$, which may also be written as $3AB^2\cos(2b-a)$, which represents the upper third order product. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in a PIM detector from the knowledge of the amplitude and phase of the first and second signals; this information is available in a baseband representation of the first and second signals.

It may be necessary to frequency shift the intermodulation products generated at baseband to produce the simulated intermodulation products suitable for correlating with interference in the received signal, so that simulated intermodulation products are aligned in frequency with the intermodulation products in the interference to the received signal. This is because the centre frequency of the intermodulation products interfering with the received signal may not correspond with the centre frequency of the received uplink channel of the received signal, but may be offset by an offset frequency.

The frequency shifting may comprise shifting by a frequency determined by adjusting the frequency shift to a plurality of frequency shift values and selecting a frequency for the frequency shifting shift on the basis of data representing a correlation of a delayed interference signal with the received signal for each of the plurality of frequency shift values. So, for example, the frequency shift may be selected that gives the largest correlation magnitude. In this way, a frequency shift value may be adjusted to remove an unknown component to the offset between the frequency of the channel in which the received signal is received and the frequency of the intermodulation products in the interference to the received signal. The unknown component to the frequency offset may, for example, be caused if the precise frequency relationship between frequencies used to upconvert the first and/or second signals and the frequency used to downconvert the received signal is not known.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of detecting and characterising passive intermodulation (PIM) interference at a Multiple Input Multiple Output (MIMO) antenna array comprising a first group of antennas for operation in a first band and a second group of antennas for operation in a second band, the method comprising:
receiving first digital signals representing respective first MIMO signal components transmitted at a first carrier frequency from each antenna of the first group of antennas and receiving second digital signals representing respective second MIMO signal components transmitted at a second carrier frequency from each antenna of the second group of antennas;
receiving third digital signals representing signals received at an antenna under analysis comprising interference generated by intermodulation between the first MIMO signal components and the second MIMO signal components;
processing the first digital signals and the second digital signals to determine a plurality of partial simulated PIM signals, each partial simulated PIM signal being generated from digital signals representing a respective one of the MIMO signal components transmitted from one group of the first and second groups of antennas and from digital signals representing of all of the MIMO signal components transmitted from the other group of the first and second groups of antennas; and
determining a magnitude of a cross-correlation between the third digital signals representing signals comprising interference received at the given antenna and each of the plurality of partial simulated PIM signals.

2. The method of claim 1, comprising generating an output indicative of the magnitudes of the determined cross-correlations.

3. The method of claim 2, wherein the output is a digitally encoded electronic signal.

4. The method of claim 2, wherein the output is displayed on a graphical user interface.

5. The method of claim 1, wherein the plurality of partial simulated PIM signals comprises a plurality of first partial simulated PIM signals each generated from samples of a respective one of the first MIMO signal components and samples of all of the second MIMO signal components, and a plurality of second partial simulated PIM signals each generated from samples of a respective one of the second MIMO signal components and samples of all of the first MIMO signal components, and the method comprises:
normalising the outputs indicative of the magnitudes of the determined cross-correlations such that the greatest magnitude of the determined cross-correlations for the first band has substantially the same value as the greatest magnitude of the determined cross-correlations for the second band.

6. The method of claim 5, comprising processing the normalised outputs indicative of the magnitudes of the determined cross-correlations to determine a relative level of contribution to the PIM interference at the given antenna from each MIMO component.

7. The method of claim 6, comprising determining, from the relative level of contribution to the PIM interference at the given antenna from each MIMO component, the relative level of contribution to the PIM interference at the given antenna from each transmit antenna.

8. The method of claim 7, comprising:
processing the first digital signals and the second digital signals to determine a composite simulated PIM signal generated from samples of all of the MIMO signal components transmitted from each of the first and second groups of antennas;
determining a magnitude of a cross-correlation between the third digital signals representing interference received at the given antenna and the composite simulated PIM signal and comparing the magnitude to a first threshold to determine whether the given antenna passes or fails a PIM interference test; and
dependent on the given antenna failing the PIM interference test, comparing the relative level of contribution to the PIM interference at the given antenna from each transmit antenna to a second threshold to determine which transmit antenna or antennas contribute significantly to the PIM interference at the given receive antenna.

9. The method of claim 8, comprising generating an output indicating which transmit antenna or antennas contribute significantly to the PIM interference at the given receive antenna.

10. The method of claim 1, wherein at least one antenna is a member of both the first group of antennas and the second group of antennas and is configured to operate at both the first band and the second band.

11. The method of claim 1, wherein at least one of the first group of antennas and the second group of antennas comprises at least one antenna providing coverage to a first cellular sector and at least one antenna providing coverage to a second cellular sector.

12. A Multiple Input Multiple Output (MIMO) passive intermodulation (PIM) analysis test set for detecting and characterising passive intermodulation interference at a MIMO antenna array comprising a first group of antennas for operation in a first band and a second group of antennas for operation in a second band, the apparatus comprising:
one or more receivers for receiving:
first digital signals representing respective first MIMO signal components transmitted at a first carrier frequency from each antenna of the first group of antennas;
second digital signals representing respective second MIMO signal components transmitted at a second carrier frequency from each antenna of the second group of antennas, and
third digital signals representing signals received at an antenna under analysis comprising interference generated by intermodulation between the first MIMO signal components and the second MIMO signal components; and
a processor configured to:
process the first digital signals and the second digital signals to determine a plurality of partial simulated PIM signals, each partial simulated PIM signal representing intermodulation between a respective one of the MIMO signal components transmitted from one group of the first and second groups of antennas and all of the MIMO signal components transmitted from the other group of the first and second groups of antennas;

determine a magnitude of a cross-correlation between the third digital signals representing signals comprising interference received at the given antenna and each of the plurality of partial simulated PIM signals; and generate an output indicative of the determined cross-correlations.

13. The MIMO PIM analysis test set of claim 12, wherein the one or more receivers for receiving the first, second and third digital signals are optical receivers for receiving digital signals from an optical fibre.

14. The MIMO PIM analysis test set of claim 13, wherein the optical receivers are for connection to optical taps inserted into respective Common Public Radio Interface (CPRI) connections between a baseband unit and a radio head at a cellular wireless base station.

15. The MIMO PIM analysis test set of claim 12, comprising a graphical user interface configured to display a representation of the output indicative of the determined cross-correlations.

* * * * *